UNITED STATES PATENT OFFICE.

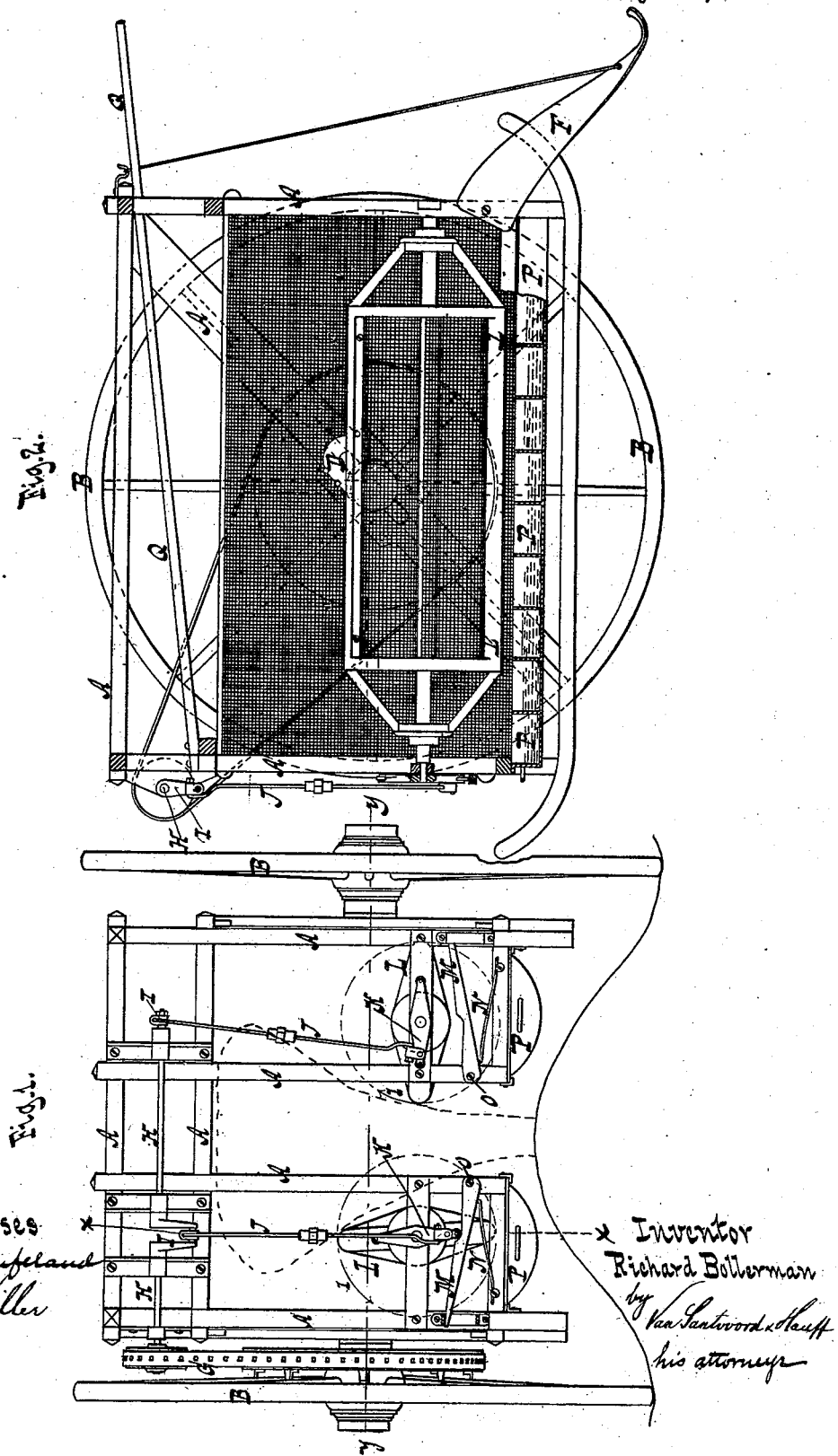

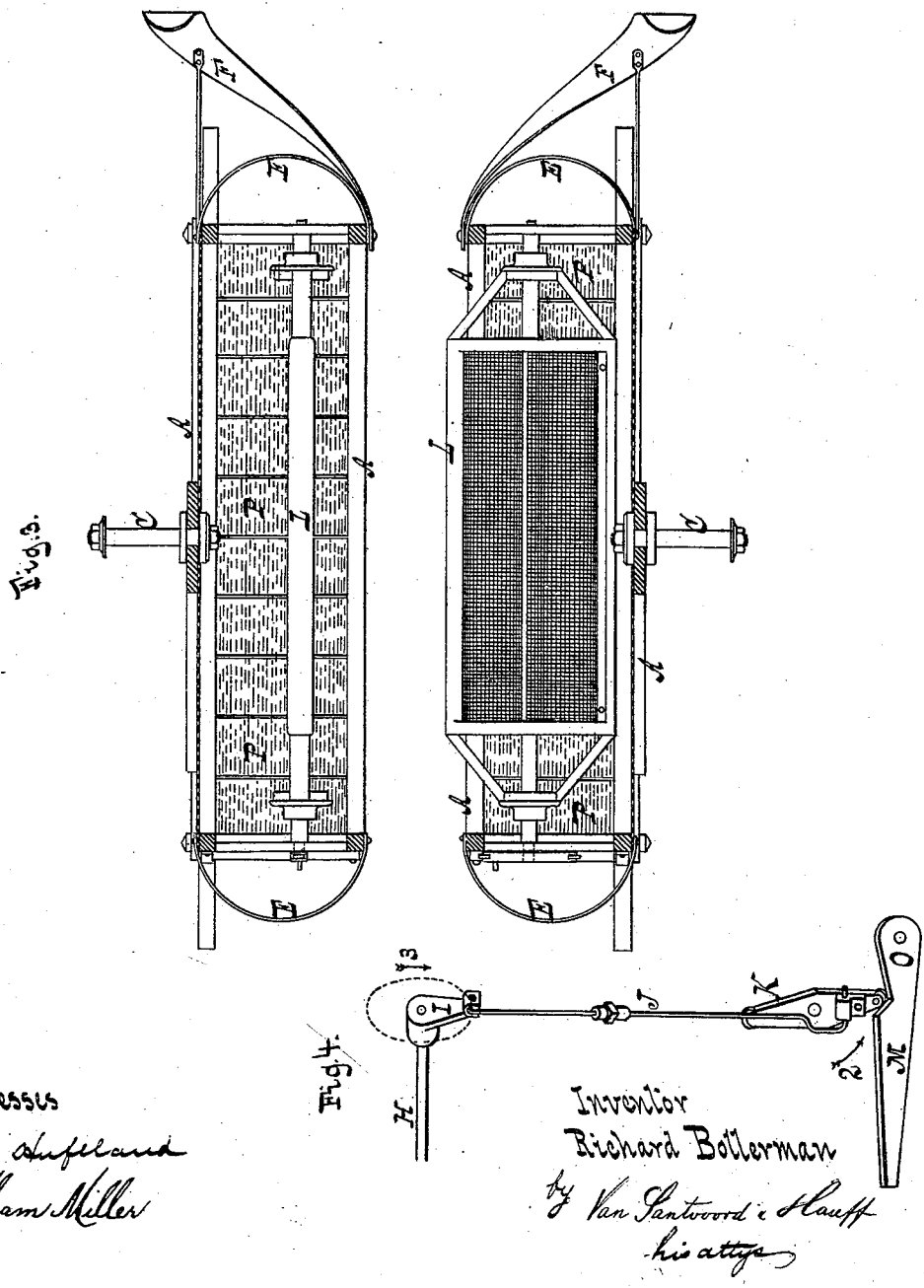

RICHARD BOLLERMAN, OF NEW YORK, N. Y.

MACHINE FOR REMOVING INSECTS FROM PLANTS.

SPECIFICATION forming part of Letters Patent No. 244,176, dated July 12, 1881.

Application filed December 1, 1880. (Model.)

*To all whom it may concern:*

Be it known that I, RICHARD BOLLERMAN, a citizen of the United States, residing at New York, in the county and State of New York, have invented new and useful Improvements in Machines for Removing Insects from Plants, of which the following is a specification.

This invention relates to improvements in machines for removing insects from plants and collecting them in troughs; and the invention consists, essentially, in the combination, with a frame mounted on wheels and provided with side walls of netting or other material, and constructed with a longitudinal opening for the passage of the plants, of two troughs or receptacles, arranged in the bottom portion of the wheeled frame at opposite sides of the longitudinal opening, and two horizontal bolsters inclosed within the side walls of the frame and revolving in opposite directions, one arranged above each of the troughs, and having their ends journaled on the wheeled frame, all of which will be more fully hereinafter set forth.

Other features of the invention will be hereinafter described, and pointed out in the claims.

My invention is illustrated in the accompanying drawings, in which Figure 1 is a rear view of my machine. Fig. 2 is a section in the plane *x x*, Fig. 1. Fig. 3 is a section in the plane *y y*, Fig. 1; and Fig. 4 represents a detached perspective view of a portion of the mechanism for imparting rotary motion to the beaters in opposite directions.

Similar letters indicate corresponding parts.

The letter A represents a frame supported on wheels B B. The axles C C, Fig. 3, of the wheels are bolted or otherwise fastened into slots D, Fig. 2, in the frame A, so that they are adjustable in the same.

In the frame A is a central opening, as shown in Figs. 1 and 3, and as the machine is drawn through a field or garden the mold-board-shaped flanges E E guide the plants into this central opening. Plow-shaped guides F may be provided, to assist the flanges E in guiding the plants into the central opening.

To a pulley on one of the wheels B is secured a belt, G, which, when said wheel is revolving, communicates a revolving motion to the shaft H and cranks I. The rods J communicate the motion from the cranks I to the cranks K and the beaters L. By the beaters L the insects on the plants are caught and thrown toward the outer sides of the frame A, which are covered with canvas, wire-netting, or other material, as shown in Fig. 2. From thence the insects fall into the trough P, which is filled with petroleum or similar material, where they are destroyed. This trough P rests in lugs in the bottom of the frame, Fig. 1, so that it can be readily slipped out, like a drawer, in order to be cleaned. The trough P is also divided into smaller compartments by partitions, Figs. 2 and 3, so that when the machine is drawn up or down hill the petroleum or other liquid will not spill.

The driving-shaft H, as before stated, receives motion through the belt G from the wheel B, and thus a revolving motion is imparted to the crank I on the shaft H. By the rod J this motion is conveyed to the crank K and to the beaters, which are mounted on the shaft of said crank K. It is necessary that the beaters L should revolve in the direction shown thereon by the arrows 1 in Fig. 1, so that the insects are thrown into the interior of the machine. To insure this motion of the beaters L, I provide the arms M, which swing about pivots O, and are pressed upward by springs N. On the upper face of each of the arms M is a shoulder. When one end of the crank K is in contact with this shoulder, as shown in Figs. 1 and 4, said crank is in a slightly-inclined position, as shown.

In the position of the parts shown in said Fig. 4 the lower end of the crank I has almost reached its lowest point, and the crank stands in an almost vertical position. When, now, this crank I begins to revolve in the direction of the arrow 3 shown thereon, the crank K strikes the shoulder of the arm M, and is retained in the position shown in Fig. 4 until the crank I has passed its dead-center, and as the motion of this crank continues in the direction of arrow 3 the crank K is turned in the direction of arrow 2. When the crank K is revolving in the direction of arrow 2 the ends of the crank alternately strike the top face of the arm M outside of the shoulder on said arm; or, in other words, the ends of the crank K strike the top face of the arm M to one side of the shoulder and near the free end of said arm M. As the spring N allows the arm M to yield, the ends of the crank K, when thus coming in contact with said arm M, press it downward, and continue to revolve in the direction of the arrow 2. To enable the ends of the crank K to glide easily over the arm M they are preferably provided with rollers. Should at any time the motion of the crank K become reversed, the crank will revolve in the direction opposite to that of arrow 2 until one end of said crank strikes against the shoulder on the arm M, as shown in Fig. 4, whereby said crank K is prevented from revolving further, and is held stationary until the crank I has moved far enough to cause the crank K to again revolve, when said crank begins to revolve in the direction of arrow 2, as above described.

It is obvious that, whether the crank I revolves in the direction of arrow 3 or in an opposite direction, the arm M will always cause the crank K to revolve in the direction of the arrow 2 by acting as above described.

The beaters L are preferably constructed of frames covered with wire netting or similar material.

A shaft or handle, Q, is provided, to draw or push the machine through the field or garden.

My invention is intended particularly for removing potato-bugs from potato-plants; but it can be used for removing bugs or insects from other plants which are planted in rows similar to potato-plants.

Heretofore a machine for removing insects from plants has been arranged to straddle a row of plants, and provided with vibratory whips or brushes for knocking the insects into receptacles, and such is therefore not claimed by me.

What I claim as new, and desire to secure by Letters Patent, is—

1. In a machine for removing insects from plants, the combination, with a frame mounted on wheels and provided with vertical side walls of netting or other material, and constructed with a longitudinal central opening for the passage of the plants, of two troughs or receptacles, arranged in the bottom of the frame at opposite sides of the central opening, and two horizontal beaters inclosed within the side walls of the frame and revolving in opposite directions, one arranged above each of the troughs, and having their ends journaled in the frame of the machine, all substantially as shown and described.

2. The combination, with a wheeled frame having side walls of netting or other material, and provided with a longitudinal central opening for the passage of the plants, of two troughs or receptacles arranged in the bottom of the frame on opposite sides of the central opening, two horizontal beaters inclosed by the walls of the frame and arranged respectively above the troughs or receptacles, and having their ends journaled on the frame of the machine, and mechanism, substantially as herein shown and described, receiving motion from the axle of the wheeled frame, and connected with the shafts of the beaters for revolving them in opposite directions with respect to the central opening through the frame, substantially as described.

In testimony whereof I have hereunto set my hand and seal in the presence of two subscribing witnesses.

RICHARD BOLLERMAN. [L. S.]

Witnesses:
W. HAUFF,
E. F. KASTENHUBER.